(12) United States Patent  
Momose et al.

(10) Patent No.: US 11,472,112 B2  
(45) Date of Patent: Oct. 18, 2022

(54) COMPOSITE OBJECT AND COMPOSITE OBJECT PRODUCING METHOD

(71) Applicant: ANALYTICWARE, INC., Tokyo (JP)

(72) Inventors: Kimio Momose, Tokyo (JP); Hirotaka Kobayashi, Tokyo (JP)

(73) Assignee: ANALYTICWARE, INC., Tokyo (JP)

( * ) Notice: Subject to any disclaimer, the term of this patent is extended or adjusted under 35 U.S.C. 154(b) by 165 days.

(21) Appl. No.: 15/738,751

(22) PCT Filed: Jun. 24, 2016

(86) PCT No.: PCT/JP2016/068750  
§ 371 (c)(1),  
(2) Date: Dec. 21, 2017

(87) PCT Pub. No.: WO2016/208700  
PCT Pub. Date: Dec. 29, 2016

(65) Prior Publication Data  
US 2018/0169949 A1    Jun. 21, 2018

(30) Foreign Application Priority Data

Jun. 26, 2015 (JP) .............................. JP2015-128322

(51) Int. Cl.  
*B29C 64/386* (2017.01)  
*A63H 33/08* (2006.01)  
(Continued)

(52) U.S. Cl.  
CPC ............. *B29C 64/386* (2017.08); *A63H 3/36* (2013.01); *A63H 9/00* (2013.01); *A63H 33/08* (2013.01);  
(Continued)

(58) Field of Classification Search  
CPC ........ B29C 64/386; A63H 33/08; A63H 9/00; A63H 3/36; B33Y 50/00; B33Y 80/00; B33Y 10/00  
See application file for complete search history.

(56) References Cited

U.S. PATENT DOCUMENTS 3,005,282 A * 10/1961 Christiansen ........ A63H 33/086  
446/128  
3,616,943 A * 11/1971 Brink ................. B65D 21/0235  
206/508  
(Continued)

FOREIGN PATENT DOCUMENTS

EP          1901824 A1    3/2008  
FR      2 973 715 A1    10/2012  
(Continued)

OTHER PUBLICATIONS

International Search Report dated Oct. 25, 2016 during the prosecution of International Application No. PCT/JP2016/068750.  
(Continued)

*Primary Examiner* — Jeffrey S Vanderveen  
(74) *Attorney, Agent, or Firm* — Troutman Pepper Hamilton Sanders LLP (57) ABSTRACT

In order to provide a composite object that can be produced at high quality and low cost using a 3D printer, a composite object includes: a first object obtained by assembling one or at least two assemblable toy blocks; and a second object constituted by one or at least two parts produced through 3D printing, and configured to be attached to the first object so as to cover at least a portion except for part of a surface thereof. Accordingly, it is possible to produce an object at high quality and low cost using a 3D printer.

11 Claims, 6 Drawing Sheets

(51) Int. Cl.
  *A63H 3/36* (2006.01)
  *A63H 9/00* (2006.01)
  *B33Y 80/00* (2015.01)
  *B33Y 10/00* (2015.01)
  *B29C 67/00* (2017.01)
  *B33Y 50/00* (2015.01)
(52) U.S. Cl.
  CPC .............. *B29C 67/00* (2013.01); *B33Y 10/00* (2014.12); *B33Y 50/00* (2014.12); *B33Y 80/00* (2014.12)

(56) References Cited

U.S. PATENT DOCUMENTS

| | | | |
|---|---|---|---|
| 7,006,952 B1 | 2/2006 | Matsumoto et al. | |
| 2013/0233872 A1* | 9/2013 | Tessier | B65D 25/20 220/737 |
| 2013/0241114 A1* | 9/2013 | Ravich | B33Y 10/00 264/401 |
| 2015/0165690 A1* | 6/2015 | Tow | B29C 64/393 700/119 |
| 2015/0190724 A1* | 7/2015 | Licht Botcher | B29C 70/78 446/85 |

FOREIGN PATENT DOCUMENTS

| | | |
|---|---|---|
| JP | 1962-18847 U | 7/1962 |
| JP | 8-11218 A | 1/1996 |
| JP | 2001-166809 A | 1/1996 |
| JP | 10-217337 A | 8/1998 |
| JP | 10217337 A * | 8/1998 |
| JP | 3068990 U | 3/2000 |
| JP | 2001-166809 A | 6/2001 |
| JP | 2002-251209 A | 9/2002 |
| JP | 2011-192469 A | 9/2011 |
| JP | 201510104573 A1 | 6/2015 |
| KR | 10-2016-0088768 A | 7/2016 |
| WO | 2013/004245 A1 | 1/2013 |
| WO | 2014005591 A1 | 1/2014 |
| WO | 2014/028505 A1 | 2/2014 |

OTHER PUBLICATIONS

Office Action of Intellectual Property Office dated Jun. 16, 2017 during the prosecution of Taiwanese Patent Application No. 105119214.
Office Action of Intellectual Property Office dated Oct. 25, 2017 during the prosecution of Taiwanese Patent Application No. 105119214.
Mueller, S., Mohr, T., Guenther, K., Frohnhofen,J. and Baudisch, P. "faBrickation: Fast 3D Printing of Functional Objects by Integrating Construction Kit Building Blocks".
The Official Decision of Rejection dated Jan. 23, 2018 during the prosecution of Taiwanese Patent Application No. TW105119214 with English Translation.
Extended European Search Report issued for Application No. 16814469.9 dated Nov. 26, 2018.
Greenberg, "How-a-geek-dad-and-his-3d-printer-aim-to-liberate-legos", May 4, 2012, pp. 1-3, retrieved from http://www.forbes.com/sites/andygreenberg/2012/04/05/how-a-geek-dad-and-his-3d-printer-aim-to-liberate-legos/.
Japanese Notification of Reasons for Refusal issued for Application No. 2015-128322 dated Jan. 18, 2019.
Communication pursuant to Article 94(3) EPC issued in corresponding European Patent Application No. 16 814 469.9 dated Oct. 18, 2019.
Final Notification of Reason(s) for Refusal issued in corresponding Japanese Patent Application No. 2015-128322 dated Aug. 23, 2019 (with machine translation).
Communication pursuant to Article 94(3) EPC issued in corresponding European Patent Application No. 16 814 469 dated Mar. 3, 2020.
Decision of Refusal issued in corresponding Japanese Patent Application No. 2015-128322 dated Mar. 3, 2020, wtih machine translation.
Decision of Dismissal of Amendment issued in corresponding Japanese Patent Application No. 2015-128322 dated Mar. 3, 2020, with machine translation.
Notice of Reasons for Refusal issued in corresponding Japanese Patent Application No. 2015-128322 (Appeal No. 2020-7167) dated Mar. 30, 2021, with machine translation.

* cited by examiner

COMPOSITE OBJECT AND COMPOSITE OBJECT PRODUCING METHOD

CROSS-REFERENCE TO RELATED APPLICATIONS

This is a U.S. national phase application under 35 U.S.C. § 371 of International Patent Application No. PCT/JP2016/068750, filed Jun. 24, 2016, and claims benefit of priority to Japanese Patent Application No. 2015-128322, filed Jun. 26, 2015. The entire contents of these applications are hereby incorporated by reference.

FIELD OF TECHNOLOGY

The present invention relates to an object and the like produced using 3D printing.

BACKGROUND

As a conventional technique, there is a known technique using a 3D print processing unit configured to output data for a 3D (3-dimensional) printer corresponding to an object selected by an object selecting unit, thereby causing the printer to perform 3D printing (see JP 2015-104573, for example).

SUMMARY

Use of 3D printing makes it possible to easily produce an object and the like having a complex structure. However, according to conventional techniques, the inside of an object produced through 3D printing is completely filled with a material such as resin used for 3D printing, and thus the amount of the material such as resin used for 3D printing increases, which is problematic in that the material cost increases. In particular, such a material for 3D printing is a special-purpose material, which is expensive, resulting in a problem that the material cost is expensive. Furthermore, the time necessary for printing is long, and thus, the time taken to print one object becomes long, resulting in a problem that the production cost increases.

If the inside of an object is made hollow, a sufficient strength may not be maintained depending on the shape of an object produced, the type of resin used for printing, or the like, resulting in a problem that an object having a high quality cannot be produced.

As described above, conventional techniques are problematic in that it is difficult to produce a high-quality and low-cost object using a 3D printer.

The present invention was arrived at in order to solve the above-described problems, and it is an object thereof to provide a composite object that can be produced at high quality and low cost using a 3D printer.

The present invention is directed to a composite object including: a first object; and a second object constituted by one or more parts produced through 3D printing, and configured to be attached to the first object so as to cover at least a portion except for part of a surface thereof, the second object being different from the first object.

With this configuration, it is possible to produce an object at high quality and low cost using a 3D printer. For example, if the first object is used, it is possible to reduce the amount of second object produced through 3D printing, to reduce the amount of material for 3D printing, to shorten the time necessary for printing, and to reduce the production cost. For example, if the first object is arranged, it is possible to increase the strength of the composite object, and to improve the quality of the composite object while maintaining the strength of the composite object.

The composite object according to the present invention is such that the second object is attached to the first object so as to cover at least a portion except for a bottom face thereof.

With this configuration, it is possible to produce an object at high quality and low cost using a 3D printer. For example, if the first object is used, it is possible to reduce the amount of second object produced through 3D printing, to reduce the amount of material for 3D printing, to shorten the time necessary for printing, and to reduce the production cost. For example, if the first object is arranged inside the composite object, it is possible to increase the strength of the composite object, and to improve the quality of the composite object while maintaining the strength of the composite object.

The composite object according to the present invention is such that the first object is an object having one or more assemblable toy blocks.

With this configuration, it is possible to produce an object at high quality and low cost using a 3D printer. For example, if the first object is used, it is possible to reduce the amount of second object produced through 3D printing, to reduce the amount of material for 3D printing, to shorten the time necessary for printing, and to reduce the production cost. For example, if the first object constituted by toy blocks is arranged inside the composite object, it is possible to increase the strength of the composite object, and to improve the quality of the composite object while maintaining the strength of the composite object. Furthermore, if the first object is constituted by assembling toy blocks, it is possible to flexibly use the first object in composite objects having various appearances and sizes.

The composite object according to the present invention is such that the second object is made of a material different from a material of which the first object is made.

With this configuration, it is possible to produce an object at high quality and low cost using a 3D printer. For example, it is possible to use, as the first object, materials that cannot be used in a 3D printer, such as materials having higher strength than those produced by a 3D printer.

The composite object according to the present invention is such that each of toy blocks constituting the first object has a joining unit for joining with another block, one or more joining units are positioned on a surface of the first object, and the second object is shaped to be joined with the one or more joining units positioned on the surface of the first object, at a position facing the one or more joining units.

With this configuration, it is possible to join the first object and the second object through joining units, to easily produce the composite object, and to improve the attachment strength between the first object and the second object.

The composite object according to the present invention is such that the second object has a surface shape indicated by 3D modeling data of one subject.

With this configuration, it is possible to easily make a surface shape of the composite object, into a shape according a subject in an actual space.

The composite object according to the present invention is such that the second object is constituted by multiple parts, and each of the multiple parts constituting the second object has a fitting structure configured to be fitted to a part adjacent thereto.

With this configuration, it is possible to easily combine multiple parts constituting the second object, and to improve the attachment strength between the parts.

The composite object according to the present invention is such that the second object is shaped to be fitted to the first object.

With this configuration, it is possible to easily combine the first object and the second object, and to improve the attachment strength between the first object and the second object.

According to the present invention, it is possible to provide a composite object that can be produced at high quality and low cost using a 3D printer.

DETAILED DESCRIPTION

Hereinafter, an embodiment of a composite object and the like will be described with reference to the drawings. It should be noted that constituent elements denoted by the same reference numerals in the embodiment perform similar operations, and thus a description thereof may not be repeated.

Figure 1A:
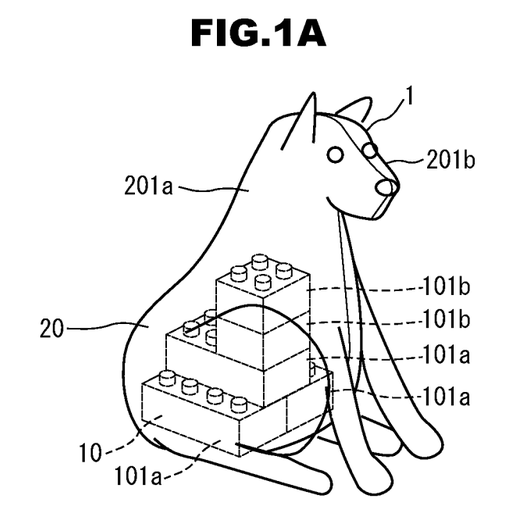
FIG. 1(a) shows a perspective view showing an example of a composite object in an embodiment of the present invention.
Figure 1B:
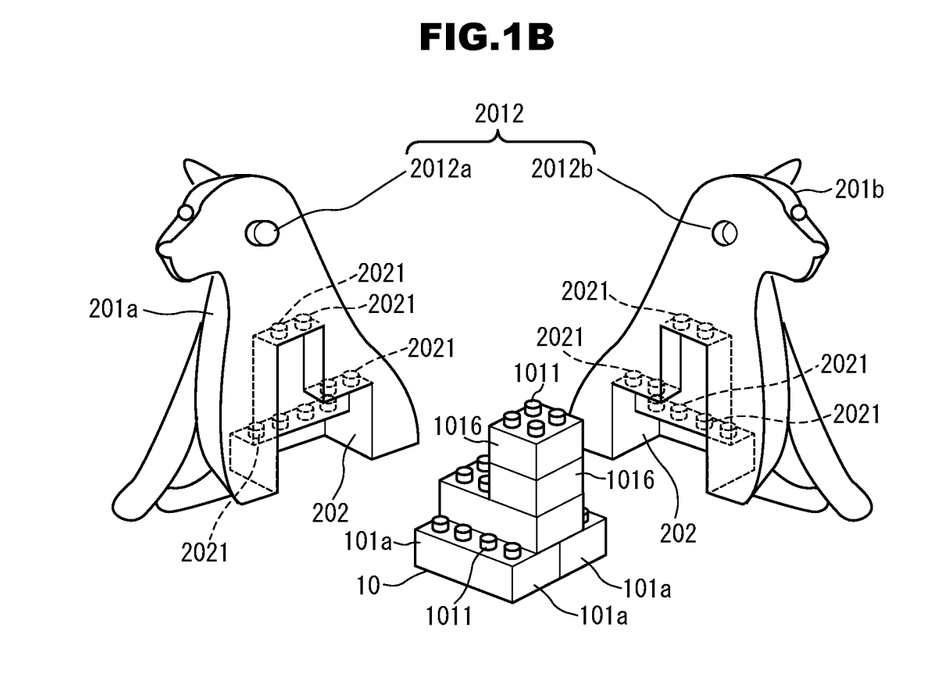
FIG. 1(b) is a view showing a state before the composite object is assembled.

FIG. 1 shows a perspective view showing an example of a composite object 1 in this embodiment (FIG. 1(a)), and a view showing an example of a state before multiple parts constituting a second object 20 is attached to a first object 10 (FIG. 1(b)).

FIG. 2 shows a perspective view showing an example of a toy block 101 used for constituting the first object 10, as viewed from above (FIG. 2(a)), a perspective view thereof as viewed from below (FIG. 2(b)), a perspective view showing an example of a state in which two the toy blocks 101 are assembled, as viewed from above (FIG. 2(c)), and a perspective view thereof as viewed from below (FIG. 2(d)).

The composite object 1 includes the first object 10 and the second object 20. The composite object is, for example, an object constituted by multiple objects. The multiple objects constituting the composite object may be made of the same material, or may be made of different materials.

The first object 10 is, for example, an object having one or at least two assemblable toy blocks 101 (hereinafter, referred to as "blocks 101"). For example, it is an object obtained by assembling one or at least two assemblable toy blocks 101. The first object 10 may be considered as an object for reinforcing the composite object 1. Also in the case where the number of blocks 101 constituting the first object 10 is one, the first object 10 may be considered as being obtained by assembling one block. There is no limitation on the shape of the first object 10, as long as it is a shape that can be realized by assembling one or at least two blocks 101. Two or more blocks 101 constituting one first object 10 are assembled typically via joining units 1011 described later. Note that the two or more blocks 101 constituting one first object 10 may be assembled by joining the joining units 1011 and furthermore by causing the blocks 101 to adhere to each other using an adhesive or the like.

Figure 2A:
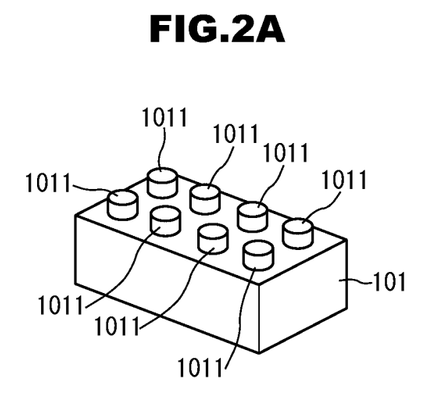
FIG. 2(a) shows a perspective view showing an example of a toy block constituting a first object of the composite object, as viewed from above.
Figure 2B:
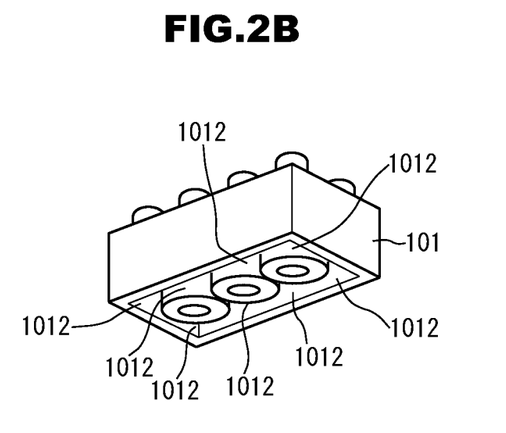
FIG. 2(b) is a perspective view thereof as viewed from below.
Figure 2C:
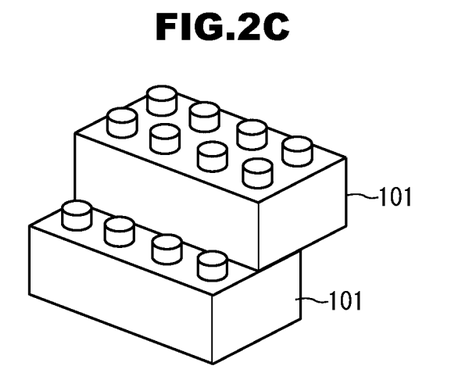
FIG. 2(c) is a perspective view showing an example of a state in which two toy blocks are assembled, as viewed from above.
Figure 2D:
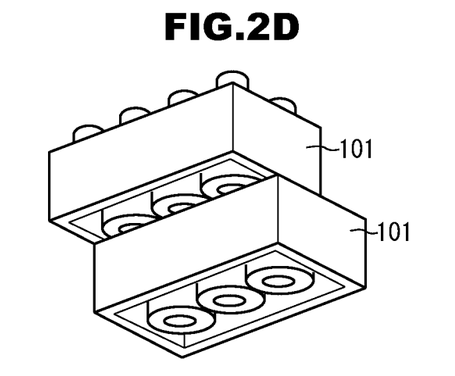
FIG. 2(d) is a perspective view thereof as viewed from below.

Each of the one or at least two blocks 101 has one or at least two joining units 1011 used for joining with other one or at least two blocks 101. Each of the blocks 101 has, for example, one or at least two engageable units 1012 that can be engaged with the joining units 1011, and, if at least one joining unit 1011 of one block 101 is engaged with at least one engageable unit 1012 of another block 101, the one block 101 and the other block 101 are joined to each other, for example, as shown in FIGS. 2(c) and 2(d). The blocks 101 are joined to each other in this manner, so that the first object 10 is assembled. The joining units 1011 are, for example, protrusions provided on a block 101 as shown in FIG. 2(a). The protrusions may be each in the shape of a solid cylinder or a quadrangular prism, and there is no limitation on their shape, size, and the like. The engageable units 1012 are, for example, recesses, grooves, or gaps that can be engaged with the protrusions forming the joining units 1011 as shown in FIG. 2(b). Each of the blocks 101 typically has the joining units 1011 on its upper face side, and has the engageable units 1012 on its bottom face side.

There is no limitation on the material, the color, and the like of the one or at least two blocks 101. The material for the blocks 101 is, for example, resin. Furthermore, there is no limitation on the size and the like of the blocks 101.

There is no limitation on the three-dimensional shape of the blocks 101. For example, the three-dimensional shape of the blocks 101 is a rectangular parallelepiped or a cube. The multiple blocks 101 constituting the first object 10 may be blocks having the same three-dimensional shape, or may be blocks having different three-dimensional shapes. One or more blocks 101 each may be a block constituted by a plate-like member on which one or more joining units 1011 are arranged. For example, such blocks 101 can be used as a base member or a placement member of the first object 10. Typically, the two or more blocks 101 used for assembling the first object 10 preferably have joining units 1011 having a common size and engageable units 1012 having a common size, regardless of whether or not the two or more blocks 101 have the same three-dimensional shape. Alternatively, the two or more blocks 101 may have interchangeable joining units 1011 and engageable units 1012.

In this embodiment, a case will be described as an example in which, as shown in FIGS. 1(a) and 1(b), the first object 10 is obtained by assembling three blocks 101a whose planar shape is rectangular and two blocks 101b whose planar shape is quadrangular obtained by dividing a block 101a into two portions along a direction perpendicular to the longitudinal direction.

Note that, as the assemblable toy blocks 101, commonly used assemblable toy blocks can be used. For example, blocks disclosed in Japanese Examined Utility Model Application Publication No. S37-18847 can be used as the assemblable toy blocks 101.

In this embodiment, the case is described as an example in which the first object 10 is an object obtained by assembling one or more assemblable toy blocks 101, but the first object 10 may be an object other than those obtained by assembling the blocks 101. The first object 10 may be, for example, an object molded using molds or molded through injection molding, or may be an object produced through cutting or the like. In the case where the inside of a later-described second object is formed hollow, the first object 10 may be an object constituted by a material (e.g., a resin, etc.) with which the hollow portion is filled. There is no limitation on the material for the first object 10. For example, examples of the material for the first object 10 may include resins, metals, woods, and the like. The first object 10 is preferably an object excluding those produced through 3D printing.

The second object 20 is an object different from the first object 10, and is attached to the first object 10 so as to cover at least a portion except for part of a surface thereof. The covering at least a portion except for part of a surface thereof is, for example, covering at least the surface of the first object 10 except for part of the surface thereof. For example, the second object 20 may be an object that is attached to the first object 10 so as to cover the entire surface thereof. The second object 20 may be, for example, an object that is attached to the first object 10 so as to cover at least a portion except for a bottom face thereof. For example, the second object 20 may be an object that is attached to the first object 10 so as to cover the entire surface thereof including the bottom face of the first object 10 as well. The bottom face of the first object 10 is, for example, bottom faces of one or more blocks 101 that are arranged at the lowermost, among the one or more blocks 101 constituting the first object 10. The bottom face of the first object 10 is, for example, a face that is a lowermost face of the first object 10 when the composite object 1 is placed on a flat face. The state in which the object is different from the first object 10 may be considered, for example, as a state in which the first object 10 is not at least an object produced through 3D printing.

There is no limitation on the surface shape, the color, and the like of the second object 20. The second object 20 may have, for example, a surface shape indicated by 3D modeling data of one subject. For example, the second object 20 may have a surface shape indicated by 3D modeling data produced using one or more images obtained by imaging one subject from different orientations. The 3D modeling data is, for example, data for defining the shape and the like of the object in a virtual three-dimensional space. The 3D modeling data may have information on the texture, the color, and the like of the surface of the object, and information on the material, the color, and the like of each portion of the object. The 3D modeling data may be referred to also as 3D data, a 3D model, or the like. The one or more images that are used to produce the 3D modeling data are preferably two or more images. The one or more images obtained by imaging one subject from different orientations may be one or more still images, or may be one or more frame images constituting a moving image obtained by imaging the one subject from different orientations. The one or more images obtained by imaging a subject may be images obtained by imaging the subject using a 3D scanner or the like. The technique for acquiring 3D modeling data having an appearance of an object from one or more images obtained by imaging the object in an actual space is a known technique, and, thus, in this example, a detailed description thereof has been omitted. For example, see JP 2001-166809A (p. 1, FIG. 1, etc.). There is no limitation on the format, the file type, and the like of 3D modeling data used in this example. The 3D modeling data may be 3D modeling data acquired through tomography such as CT scanning or the like.

For example, the thus acquired 3D modeling data is used to produce modeling data of one or at least two parts 201 constituting the second object 20, and this modeling data is used to produce the parts 201 constituting the second object 20 through 3D printing described later.

The second object 20 may have any surface shape. For example, the surface shape of the second object 20 may be a shape expressing an appearance of a person, an animal such as a pet, or a plant, or may be a shape expressing an appearance of an article such as an automobile or an airplane, or a building such a house, a castle, or a tower. Also, the surface shape may be a shape expressing an appearance, a cross-section, or the like of an organ, for example. There is no limitation on the color and the like of the second object 20. For example, the second object 20 may be an object having a color shown by a material used for printing, may be an object printed using materials respectively colored so as to have two or more colors, or may be an object whose surface is painted with one or more colors.

The second object 20 is preferably shaped such that, when the composite object 1 is placed on a flat face, the first object 10 is completely hidden. For example, the second object 20 is preferably attached to the first object 10 so as to cover at least a portion except for a bottom face thereof. The second object 20 is preferably made of an opaque material, colored so as to make the second object 20 opaque, or painted so as to make the second object 20 opaque so that the first object 10 therein is not seen. Accordingly, the first object 10 can be used as an internal reinforcing member, and, when the composite object 1 is placed on a flat face, the first object 10 is not seen from the outside, so that the influence of the first object 10 on the appearance of the composite object 1 can be suppressed to the minimum.

The second object 20 is constituted by one or at least two parts 201 produced through 3D printing. For example, if two or more parts 201 constituting the second object 20 are combined so as to respectively arranged at predesignated locations, the second object 20 having a shape that allows the second object 20 to cover the portion of the first object 10 except for the bottom face thereof is formed. In this embodiment, for example, a case will be described as an example in which the parts 201 constituting the second object 20 are two parts consisting of a first part 201a and a second part 201b.

The parts 201 produced through 3D printing are parts 201 produced (e.g., printed) using a 3D printer (not shown). There is no limitation on the method and the like of 3D printing that is used to produce the parts 201. Known examples of the 3D printing method include stereolithography, selective laser sintering, powder plaster molding, fused deposition modeling, inkjet method, and the like. 3D modeling data of each part constituting the second object 20 used for 3D printing may be 3D modeling data prepared in advance, or may be 3D modeling data produced, for example, using images obtained by imaging a subject as described later.

The parts 201 constituting the second object 20 are produced through 3D printing, and, thus, the material for the parts 201 is a material that can be used in production by a 3D printer. The material that can be used in production by a 3D printer is determined, for example, according to materials used in the 3D printer, such as filaments, toners, inks, solidifying liquids, and the like. For example, since 3D printing can print parts made of a resin, a metal, or the like, the material for the parts 201 that are to be produced is, for example, a resin, a metal, or the like.

If the second object 20 is constituted by multiple parts 201, each of the multiple parts 201 constituting the second object 20 may be provided with one or at least two fitting structures 2012 that are fitted to its adjacent part 201. For example, the fitting structures 2012 are provided on portions at which two adjacent parts 201 are in contact with each other, that is, portions that form contact faces when the multiple parts 201 constituting the second object 20 are combined. The fitting structure 2012 includes, for example, a protrusion or projection (not shown) provided on one part 201 and a recess (not shown) configured to be fitted to the protrusion or projection of the one part, the recess being provided on a part 201 adjacent to the one part, at a point thereof facing the protrusion or projection. For example, in FIG. 1(b), a protrusion 2012a provided on the first part 201a and a recess 2012b provided in the second part 201b and configured to be fitted to the protrusion 2012a constitute the fitting structure 2012.

The second object 20 is preferably shaped to be fitted to the first object 10. For example, the insides of the two or more parts 201 constituting the second object 20 have recesses 202 (hereinafter, referred to as "fitting recesses") that are shaped to be fitted to the first object 10, and, when the parts 201 are combined to form the second object 20, the fitting recesses 202 of the parts 201 are also combined, and the combined portion of the fitting recesses 202 forms a shape that allows the fitting recesses 202 to be fitted to the first object 10. If the second object 20 is constituted by one part 201, the fitting recesses 202 are provided, for example, so as to have bottom faces that are open to the one part 201 constituting the second object 20, and function as recesses configured to be fitted to the first object 10. With respect to the joining units 1011 of the first object 10 configured to be fitted into the fitting recesses 202, the fitting recesses 202 are preferably shaped to allow the joining units 1011 to be fitted thereinto. The fitting recesses 202 may have, for example, one or more recesses 2021 or grooves (not shown) configured to be fitted to one or more protrusions that are the joining units 1011 positioned on the surface of the first object 10.

Figure 3:
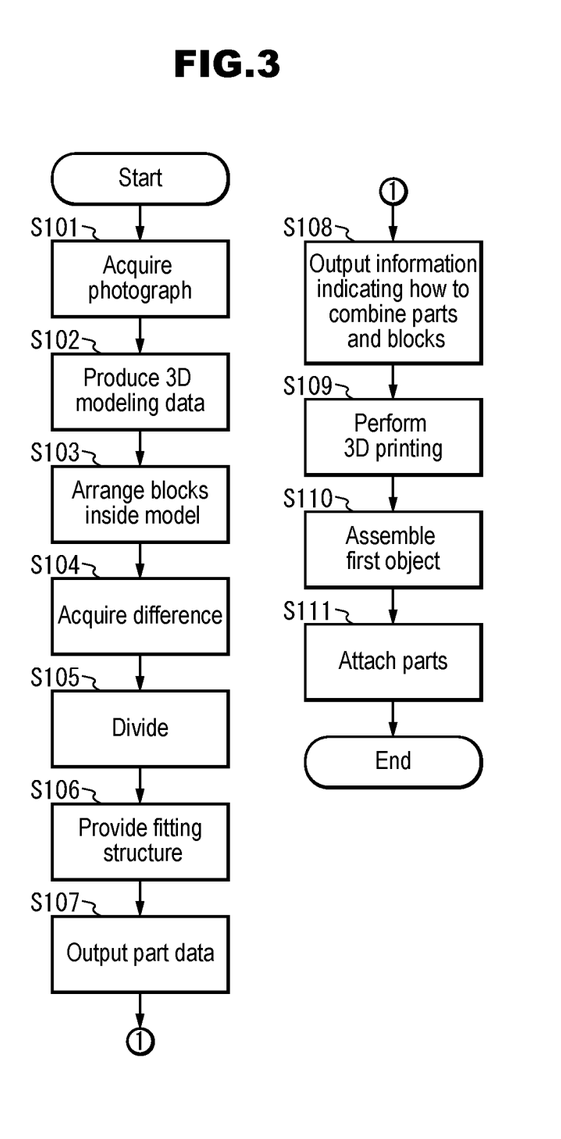
FIG. 3 is a flowchart illustrating a composite object producing method in the embodiment.

FIG. 3 is a flowchart illustrating a method for producing the composite object 1.

Figure 4A:
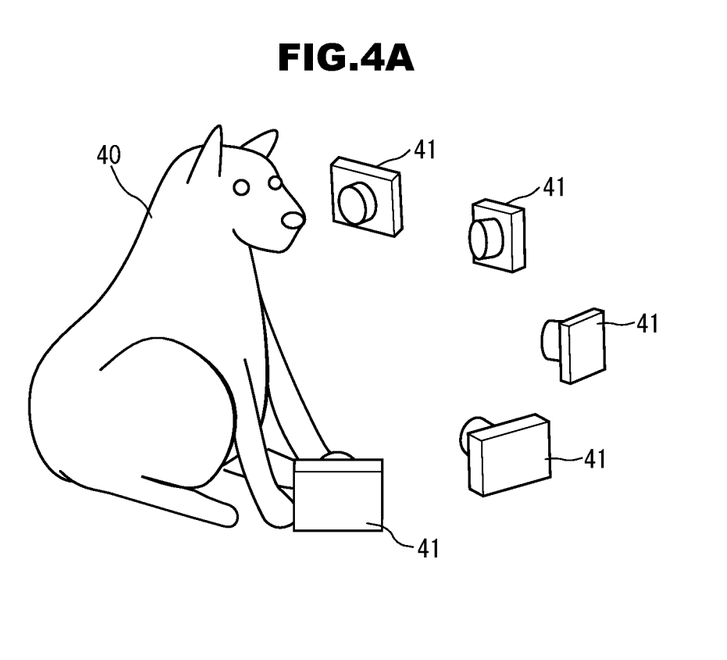
FIG. 4(a) shows a schematic view showing a state when capturing images.
Figure 4B:
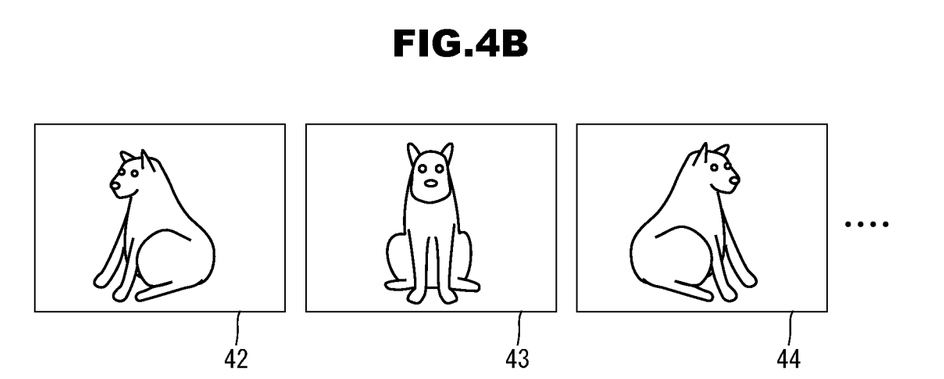
FIG. 4(b) are views showing captured images illustrating the composite object producing method in the embodiment.

FIG. 4 shows views illustrating the method for producing the composite object 1 (FIGS. 4(a) and 4(b)).

Figure 5A:
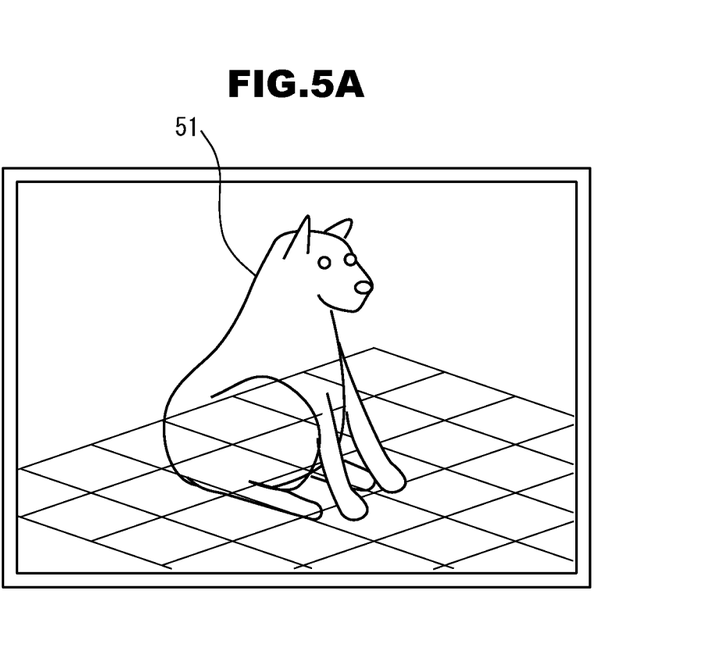
FIGS. 5(a) and 5(b) show views showing display examples of 3D modeling data illustrating the composite object producing method in the embodiment.
Figure 5B:
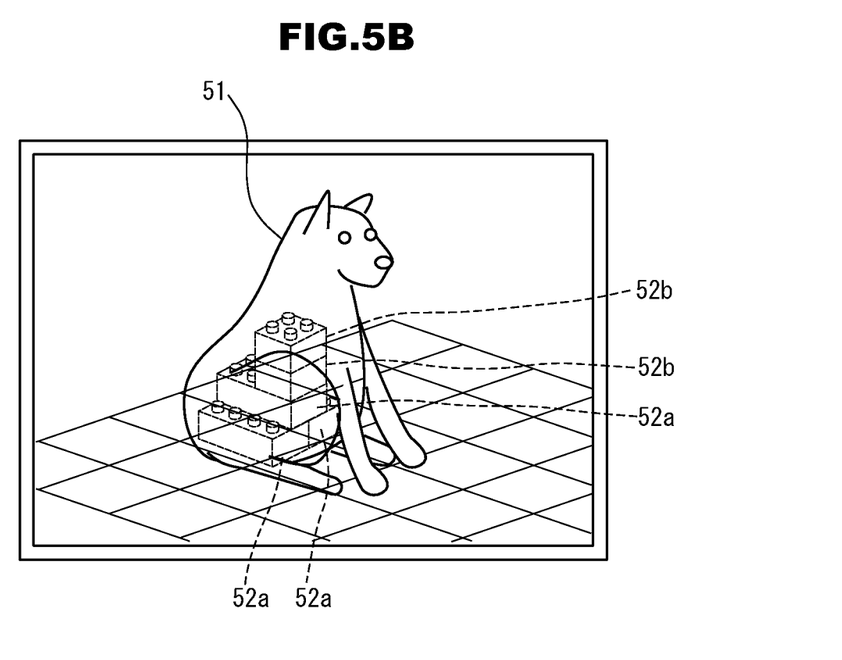

FIG. 5 shows display examples illustrating the method for producing the composite object 1 (FIGS. 5(a) and 5(b)).

Figure 6A:
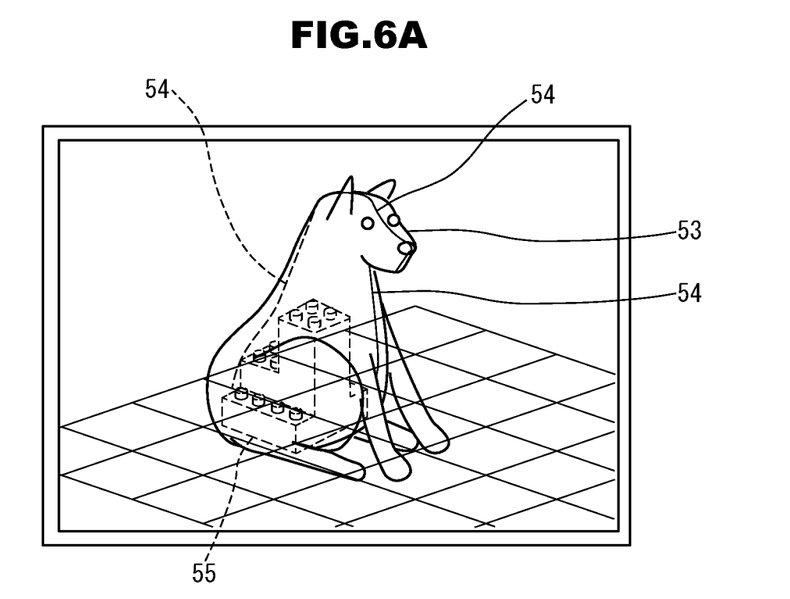
FIGS. 6(a) and 6(b) show views showing display examples of 3D modeling data illustrating the composite object producing method in the embodiment.
Figure 6B:
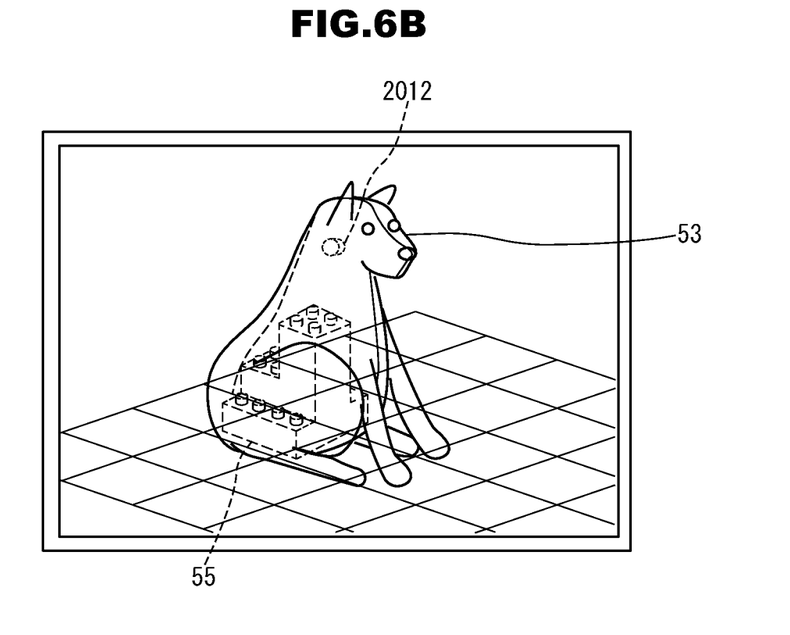

FIG. 6 shows display examples illustrating the method for producing the composite object 1 (FIGS. 6(a) and 6(b)).

FIGS. 5(a), 5(b), 6(a), and 6(b) show display examples of 3D modeling data displayed, for example, on a monitor of a computer that has executed software or the like for producing 3D modeling data.

Next, an example of the method for producing the composite object 1 will be described with reference to the flowchart in FIG. 3 and the display examples in FIGS. 4, 5, and 6. Hereinafter, a case will be described as an example in which the composite object 1 as shown in FIG. 1 is to be produced.

(Step S101) A user acquires one or more images obtained by imaging one subject. For example, the user captures images of one subject from two or more different directions using an image capturing apparatus such as a camera, thereby acquiring two or more photograph images. For example, as shown in FIG. 4(a), images of one subject 40 are captured from multiple directions using a camera 41, so that multiple images 42 to 44 and the like as shown in FIG. 4(b) are acquired.

(Step S102) A computer is caused to execute software or the like for producing 3D modeling data from images, using the images acquired in step S101, so that 3D modeling data indicating the surface shape of the composite object 1 is acquired. The data may be considered as data for defining the surface boundaries of the composite object 1. For example, it is assumed that 3D modeling data 51 as shown in FIG. 5(a) is acquired. The 3D modeling data is placed, for example, on one virtual flat face. The output size and the like of the 3D modeling data may be set by the user, or may be set by default or the like. The output size of the 3D modeling data may be changed as appropriate according to an instruction from the user or the like.

(Step S103) 3D modeling data of one or more blocks 101 is arranged inside the 3D modeling data acquired in step S102. The 3D modeling data of the blocks 101 is arranged, for example, by the user or the like using the computer that has executed the software or the like for producing 3D modeling data. The same applies to steps S104 to S108 below. For example, the 3D modeling data of the blocks 101 is arranged inside the 3D modeling data acquired in step S102 in response to an operation performed by the user on an unshown input device or the like.

When stacking pieces of 3D modeling data of the blocks 101, for example, portions corresponding to one or more joining units 1011 of 3D modeling data of one block 101 are connected to portions corresponding to engageable units 1012 of 3D modeling data of blocks 101 that are stacked on the one block 101. It is preferable that all pieces of 3D modeling data of the two or more blocks 101 arranged inside the 3D modeling data acquired in step S102 are joined to each other via the joining units 1011 or the like. Data constituted by the 3D modeling data of the thus arranged one or more blocks may be considered as modeling data for setting the structure of the first object 10, or may be considered as data for defining the structure of the first object 10 that forms an inner structure of the composite object 1.

When stacking pieces of 3D modeling data of the blocks 101, for example, it is preferable that any surface boundaries of the 3D modeling data of the blocks 101 do not bulge out from the surface boundaries of the 3D modeling data acquired in step S102. Note that the bottom face of the 3D modeling data of one or more blocks 101 arranged at the lowermost may be arranged so as to match the bottom face of the 3D modeling data acquired in step S102. With this configuration, in step S109 described later, multiple parts constituting the second object 20 configured to be arranged so as to cover at least a portion except for the bottom face of the first object 10 can be acquired through 3D printing.

In this case, for example, as shown in FIG. 5(b), it is assumed that three pieces of 3D modeling data 52a respectively corresponding to three blocks 101a and two pieces of 3D modeling data 52b respectively corresponding to two blocks 101b are arranged. The 3D modeling data 52a and the 3D modeling data 52b are combined to form the 3D modeling data of the first object 10.

The technique and the like for stack pieces of 3D modeling data indicating toy blocks while joining them using joining units as in the case of blocks are a known technique, and, thus, in this example, a detailed description thereof has been omitted. For example, see the URL below (http://ldd.lego.com/ja-jp/).

(Step S104) 3D modeling data indicating a difference between the 3D modeling data acquired in step S102 and the 3D modeling data of the first object 10 acquired in step S103 is acquired. For example, the 3D modeling data of the first object 10 acquired in step S103 is subtracted from the 3D modeling data acquired in step S102. That is to say, the 3D modeling data 52a and the 3D modeling data 52b are subtracted. 3D modeling data of the thus acquired difference is 3D modeling data 53 for setting the structure of the second object 20. The 3D modeling data 53 may be considered as data for defining the structure of the second object 20 that forms an outer structure of the composite object 1. The difference may be, for example, acquired according to an instruction from the user or the like, or may be automatically acquired. The portion in which the 3D modeling data 52a and the 3D modeling data 52b are arranged forms a portion 55 corresponding to the fitting recesses.

(Step S105) The 3D modeling data 53 for the second object 20 acquired in step S104 is divided into two or more pieces of 3D modeling data. For example, the 3D modeling data 53 is divided into multiple portions at a position designated by the user. For example, it is assumed that, as shown in FIG. 6(a), the 3D modeling data 53 indicating the difference is divided into two portions along a vertical face. In the drawing, a line 54 is a line indicating the dividing position. If the second object 20 does not have to be divided into multiple parts 201, this processing may be omitted. The object may be divided, for example, along a face or the like designated by the user.

(Step S106) The divided portions of the 3D modeling data divided in step S105 are provided with the fitting structure 2012. For example, a face of one of the divided two parts 201 is shaped to have the protrusion 2012a prepared in advance, and a face of the other divided part is shaped to have the recess 2012b prepared in advance so as to be fitted to the protrusion 2012a, at a position facing the protrusion 2012a. The positions at which the fitting structure 2012 is to be provided are designated, for example, by the user using an unshown input device or the like. For example, as shown in FIG. 6(b), the fitting structure 2012 is provided at the divided positions.

(Step S107) The 3D modeling data of the parts 201 provided with the fitting structures in step S106 is output. The output may be, for example, transmission to an unshown 3D printer, or writing of data to an unshown storage medium or the like.

(Step S108) The computer that has executed the software or the like for producing 3D modeling data outputs information for specifying the blocks 101 indicated by the 3D modeling data of the blocks 101 arranged in step S103, and information indicating positions at which the blocks 101 indicated by the information are arranged. The information for specifying the blocks 101 may be identifiers such as model numbers of the blocks, may be information indicating types of the blocks, or may be information indicating sizes, shapes, or the like of the blocks. Furthermore, information indicating positions at which the parts 201 provided with the fitting structures in step S106 are arranged is output. The information that is output may be considered as information indicating how to assemble or how to combine the composite object 1 to the user, for example, information indicating an assembling method. The information indicating positions may be information indicating a relative positional relationship between the blocks 101, between the parts 201, or between the blocks 101 and the parts 201. As the information indicating positions at which the blocks 101 or the parts 201 are arranged, for example, an image obtained by rendering, in a wireframe, the 3D modeling data of the one or more blocks 101 arranged in step S103, and the 3D modeling data of the parts 201 acquired in step S106 may be output. If the sizes of blocks that are to be used can be specified from the output image, the information for specifying the blocks 101 does not have to be output. Alternatively, an image obtained by moving the 3D modeling data indicating the blocks 101 and the parts 201 constituting the composite object 1, for example, such that the blocks 101 and the parts 201 in contact with each other are spaced away from each other by a predesignated distance or more, and rendering the moved 3D modeling data by arranging a wireframe or textures may be output. The displaying an image is display of an image on an unshown monitor or the like, printing by a printer, or the like. The information indicating positions at which the blocks 101 are arranged and the information indicating positions at which the parts 201 are arranged are, for example, information produced by the user using the 3D modeling data of the blocks 101 arranged in step S103 and the 3D modeling data of the parts 201 acquired in step S106.

(Step S109) The 3D modeling data of the parts 201 output in step S107 is used to 3D print the parts 201 using a 3D printer (not shown). Accordingly, the part 201a and the part 201b as shown in FIG. 1(b) are obtained.

When stacking pieces of 3D modeling data of the blocks 101 in step S103, it is possible that at least some of the surface boundaries of the 3D modeling data of the blocks 101 do not bulge out from the surface boundaries of the 3D modeling data acquired in step S102. The 3D modeling data of the thus obtained portions may be used to perform 3D printing. Accordingly, multiple parts constituting the second object 20 arranged so as to cover the first object 10 at least a portion except for part of a surface thereof can be acquired through 3D printing.

(Step S110) Referring to the information acquired in step S108, one or more blocks 101 indicated by the information are obtained, and the obtained blocks 101 are stacked, so that the first object 10 as shown in FIG. 1(b) is produced. Furthermore, the parts 201 obtained in step S109 are attached to the first object 10 referring to the information acquired in step S108. When attaching the parts 201 to the first object 10, the recesses 2021 in the fitting recesses 202 of the parts 201 provided at positions facing the one or more joining units 1011 of the first object 10 are fitted to the facing one or more joining units 1011. If the second object 20 is constituted by multiple parts 201, the second object 20 may be attached to the first object 10 after all parts 201 are combined such that the fitting structures 2012 are fitted to each other to form the second object 20, and this case may be considered also as attaching the parts 201 to the first object 10. When stacking the blocks 101, the blocks 101 may be adhered to each other using an adhesive or the like. Furthermore, the parts 201 constituting the second object 20, or the parts 201 and the first object 10 may be adhered to each other using an adhesive or the like. Accordingly, the composite object 1 as shown in FIG. 1(a) is produced.

Note that the user who outputs the 3D modeling data in step S107 and the user who performs 3D printing and the like in step S109 may be different users.

As described above, according to this embodiment, it is possible to provide a composite object that can be produced at high quality and low cost through 3D printing.

For example, according to this embodiment, even in the case of producing objects having the same appearance and the same size, if the first object is arranged at part of the inside of an object, it is possible to reduce the amount of portion produced through 3D printing, to reduce the amount of material used for 3D printing, to shorten the time necessary for printing, and to reduce the production cost.

Furthermore, for example, if the first object is arranged inside an object produced, the first object reinforces the object from the inside, and, thus, it is possible to maintain the strength of the object produced, and to produce a high-quality object. For example, if one or at least two stacked blocks are arranged inside an object produced, the blocks reinforce the object from the inside, and, thus, it is possible to maintain the strength of the object produced.

Furthermore, since an object having one or at least two blocks, that is, one or at least two stacked blocks are used as an object arranged inside an object produced, it is possible to easily change the shape of the structure arranged inside, by changing the type or number of blocks stacked, or the manner in which the blocks are stacked, and to flexibly set the shape of the first object arranged inside according to the shape or size of an object produced. Furthermore, variously shaped and sized toy blocks that can be joined to each other via the same joining units are commonly available and easily obtained, and, thus, it is possible to easily produce variously shaped and sized first objects. Furthermore, if the first object is an object obtained by assembling blocks, it is possible to easily produce a first object used for reinforcement and the like manually by the user, without using any dedicated apparatuses or the like.

The present invention is not limited to the embodiment set forth herein. Various modifications are possible within the scope of the present invention.

As described above, the composite object and the like according to the present invention are suitable as an object and the like produced using 3D modeling data or the like, particularly as an object and the like produced using 3D printing.

The invention claimed is:

1. A composite object comprising:
   a first object, the first object including a plurality of blocks, wherein each of the plurality of blocks has a joining unit for joining with another block, and one or more joining units are positioned on a surface of the first object; and
   a second object constituted by one or more parts produced through 3D printing, and configured to be attached to the first object so as to cover at least a portion except for part of a surface thereof, the second object being different from the first object,
   wherein the second object is shaped to be joined with the one or more joining units positioned on the surface of the first object, at a position facing the one or more joining units,
   wherein the second object has a recess into which the first object fits when the first object is attached,
   wherein the second object is attached to the first object such that the second object covers all of the first object except for a bottom face thereof, and
   wherein the first object is fitted into the recess of the second object, the recess of the second object is at a bottom of the second object, and a bottom of the first object is exposed.

2. The composite object according to claim 1, wherein the second object is made of a material different from a material of which the first object is made.

3. The composite object according to claim 1, wherein the second object has a surface shape indicated by 3D modeling data of one subject.

4. The composite object according to claim 1, wherein the second object is constituted by multiple parts, and each of the multiple parts constituting the second object has a fitting structure configured to be fitted to a part adjacent thereto.

5. The composite object according to claim 1, wherein the second object is shaped to be fitted to the first object.

6. The composite object according to claim 1, wherein the second object is attached to the first object so as to cover every portion of the first object.

7. The composite object according to claim 1, wherein the second object comprises resin.

8. The composite object according to claim 1, wherein the second object is opaque.

9. A composite object producing method comprising:
   a step of 3D printing multiple parts constituting a second object configured to be attached to a first object such that the second object covers all of the first object except for a bottom face thereof, the second object being different from the first object, and wherein the second object has a recess into which the first object fits when the first object is attached;
   a step of attaching one or more parts produced in the 3D printing step, to the first object,
   wherein the first object is fitted into the recess of the second object, the recess of the second object is at a bottom of the second object, and a bottom of the first object is exposed.

10. A composite object comprising:
    a first object, the first object including a stack of two or more blocks; and
    a second object constituted by one or more parts produced through 3D printing, the second object being different from the first object,
    wherein the second object is attached to the first object such that the second object covers all of the first object except for a bottom face thereof,
    wherein the second object has a recess into which the first object fits when the first object is attached, and
    wherein the first object is fitted into the recess of the second object, the recess of the second object is at a bottom of the second object, and a bottom of the first object is exposed.

11. A composite object comprising:
    a first object, the first object including a stack of two or more blocks; and
    a second object constituted by one or more parts produced through 3D printing, the second object being different from the first object,
    wherein the second object is attached to the first object such that the second object covers all of the first object except for a bottom face thereof,
    wherein the second object has a recess into which the first object fits when the first object is attached, and
    wherein the first object is fitted into the recess of the second object, the recess of the second object is at a bottom of the second object, and a bottom of the first object is exposed.

* * * * *